Jan. 10, 1950 W. H. STRICKER 2,494,012
FISHERMAN'S PLUG RETRIEVER
Filed Sept. 4, 1947
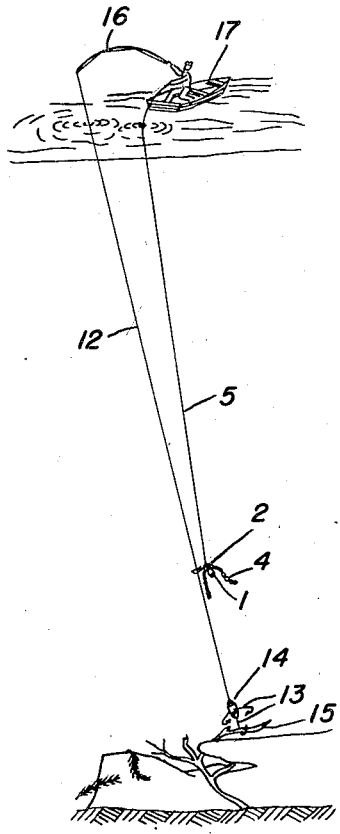
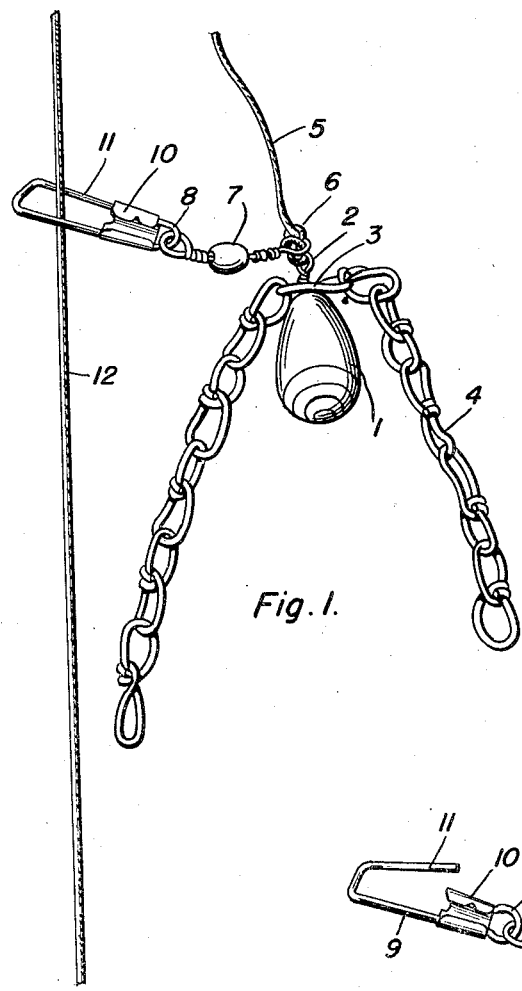
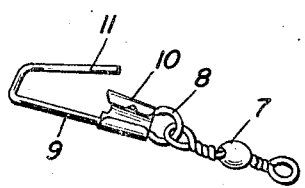
Inventor
William H. Stricker
By Clarence A. O'Brien
and Harvey B. Jacobson
Attorneys Patented Jan. 10, 1950

2,494,012

UNITED STATES PATENT OFFICE 2,494,012

FISHERMAN'S PLUG RETRIEVER

William H. Stricker, Sand Springs, Okla.

Application September 4, 1947, Serial No. 772,064

1 Claim. (Cl. 43—30)

This invention relates to improvements in fishermen's plug retrievers.

An object of the invention is to provide an improved salvaging device for retrieving fishing plugs when the same have become fouled at the bottom of the water being fished.

Another object of the invention is to provide an improved releasing device for releasing fishing plugs at the bottom of a stream or any water being fished, rather than by pulling so hard on the fouled line that it will break and the fouled plug be lost.

A further object of the invention is to provide an improved fisherman's plug retriever for lowering down a line to engage and release a fouled plug which would otherwise be lost.

Another object of the invention is to provide an improved fisherman's plug retriever which will be highly efficient in operation, and relatively inexpensive to manufacture and produce.

Other objects will appear as the description proceeds.

In the accompanying drawings which form a part of this application,

Figure 1 is an enlarged side elevation of the improved plug retrieving device;

Figure 2 is a diagrammatic view showing the plug retrieving device in actual operation, and Figure 3 is a side elevation of the safety pin guide shown in an open position.

Like characters of reference are used throughout the following specification and the accompanying drawings to designate corresponding parts.

In carrying out the invention, there is provided an improved fishing plug retriever or salvaging device including a substantially pear shape sinker 1 having a securing eye 2 at its upper end, the same being inserted through a link 3 near the center of a short length of chain 4. If desired, a second chain (not shown) may be employed with the chain 4, thereby having four depending chain ends instead of two ends, as shown.

A retrieving line 5 will be secured to the eye 2 by means of the knot 6, and a double eye connector 7 will be attached at one end to the line 5 by means of the knot 6, while its opposite end will support the eye 8 of the safety pin guide 9.

The safety pin guide will include a keeper 10 and a pin end 11 adapted to be engaged therein or disengaged therefrom while placing the guide pin about the fouled fishing line 12.

The fishing line 12 will be attached to the fisherman's pole 16, while the retrieving line 5 will be secured to the boat or skiff 17.

In operation, when the plug 14 gets fouled in a foreign object such as a branch 15 as illustrated in Figure 2 of the drawings, the fisherman will fasten the safety pin guide 9 about the fishing line 12 and lower the plug retriever with sinker 1 and chain 4 down the line 12 until it reaches the fouled plug 14. By moving the line 5 from side to side about the fishing line 12, the chain 4 will engage one of the free or unfouled hooks 13 of the fouled plug and upon a steady upward pull will release the same, whereupon the plug and retriever may be pulled aboard the boat or skiff 17.

From the foregoing description, it will be apparent that there has been devised and provided a highly efficient and inexpensive releasing and retrieving device for fouled fishing plugs.

While the preferred embodiment of the instant invention has been illustrated and described, it will be understood that many minor changes in detail of construction may be resorted to without departure from the spirit of the invention.

Having thus described my invention what I claim as new and desire to secure by Letters Patent of the United States is:

A device for use with a fishing line having a fouled plug at one of its ends comprising a plug retriever including a retrieving line, a sinker secured to said retrieving line, a chain supported intermediate its ends upon said sinker, and a safety pin guide linked to said sinker and adapted to slidably and detachably engage the fishing line whereby when the retriever line is moved from side to side about the fishing line, said chain will enmesh an unfouled hook on the fouled plug to release the same.

WILLIAM H. STRICKER.

REFERENCES CITED

The following references are of record in the file of this patent:

UNITED STATES PATENTS

| Number | Name | Date |
|---|---|---|
| 1,988,160 | Butte | Jan. 15, 1935 |